United States Patent
Brown, Jr. et al.

(10) Patent No.: US 7,335,882 B1
(45) Date of Patent: Feb. 26, 2008

(54) HIGH RESOLUTION LOW DOSE TRANSMISSION ELECTRON MICROSCOPY REAL-TIME IMAGING AND MANIPULATION OF NANO-SCALE OBJECTS IN THE ELECTRON BEAM

(75) Inventors: R. Malcolm Brown, Jr., Austin, TX (US); Zack Barnes, Austin, TX (US); Chie Sawatari, Shizuoka (JP); Tetsuo Kondo, Kukuoka (JP)

(73) Assignee: Board of Regents, The University of Texas System, Austin, TX (US)

( * ) Notice: Subject to any disclaimer, the term of this patent is extended or adjusted under 35 U.S.C. 154(b) by 427 days.

(21) Appl. No.: 11/082,239

(22) Filed: Mar. 16, 2005

Related U.S. Application Data

(60) Provisional application No. 60/553,483, filed on Mar. 16, 2004.

(51) Int. Cl.
*G01N 23/00* (2006.01)
(52) U.S. Cl. .................. 250/311; 422/68.1; 422/81; 204/192.34; 250/307
(58) Field of Classification Search ............... 250/311; 422/68.1, 81; 204/192.34
See application file for complete search history.

*Primary Examiner*—Jack I. Berman
*Assistant Examiner*—Michael J Logie
(74) *Attorney, Agent, or Firm*—Edwin Flores; Chalker Flores, LLP

(57) ABSTRACT

The present invention includes a method, apparatus and system for nanofabrication in which one or more target molecules are identified for manipulation with an electron beam and the one or more target molecules are manipulated with the electron beam to produce new useful materials.

40 Claims, 3 Drawing Sheets

HIGH RESOLUTION LOW DOSE TRANSMISSION ELECTRON MICROSCOPY REAL-TIME IMAGING AND MANIPULATION OF NANO-SCALE OBJECTS IN THE ELECTRON BEAM

CROSS REFERENCE TO RELATED APPLICATIONS

This patent claims priority to U.S. Provisional Patent Application Ser. No. 60/553,483 filed Mar. 16, 2004, the entire contents of which are incorporated herein by reference.

The United States Government may own certain rights in this invention under Department of Energy Grant No. DE-FG03-94ER20145. Without limiting the scope of the invention, its background is described in connection with micro and nanomanipulation, as an example.

TECHNICAL FIELD OF THE INVENTION

The invention relates to an apparatus and methods for the manipulation, visualization and fabrication of nanoscopic structures.

BACKGROUND OF THE INVENTION

Heretofore, in this field, the manipulation, visualization and fabrication of useful nanoscale devices has proved difficult. The capability to observe and manipulate material simultaneously at the nanoscale level is predicted to be invaluable in the design of nano-fabrication devices. Experimental manipulation and real time observation in conjunction with a nanoscale size could be vital in determining not only beginning and end products but also intermediates in the process of polymerization and polymer crystallization, leading to supermolecular architecture via material synthesis.

Several approaches have been studies for micro and nanoscale manufacturing. Among the tools being used in imaging, atomic force microscopy (AFM) is capable of observing molecular structure of a variety of materials down to the sub-nano level resolution on a consistent basis; however, real time imaging is virtually impossible since a relatively large period of time must be used in the actual scanning to obtain the image. In spite of this limitation, it has been possible to conduct experimentation on physical phenomena, such as melting and re-crystallization of polymeric specimens, with moderate modifications to the device itself (3, 4).

One technique for micromanipulation is described in U.S. Pat. No. 6,569,382, issued to Edman, et al., which describes a method and apparatus for the electronic, homogeneous assembly and fabrication of microscale devices, including micron, sub-micron and nanoscale devices. Electronic transport of movable component devices is described using a fluidic medium to effect transport to a desired target location on a substrate or motherboard. Forces disclosed include electrophoretic force, electro-osmotic force, electrostatic force and/or dielectrophoretic force. For example, free field electro-osmotic forces are used singly or in combination, as well as in conjunction with yet other forces, such as fluidic forces, mechanical forces or thermal convective forces to move molecules. Transport may be effected through the use of driving electrodes so as to transport the component device to yet other connection electrodes. In certain embodiments, the connection electrodes may also be used with driving electrodes to transport electronically the component device to the connection electrodes.

Another method of fabrication is disclosed in U.S. Pat. No. 6,508,979, issued to Requicha, et al., in which a method for fabricating or prototyping a nanoscale object is disclosed. The method includes defining a sequence of nanolayers that represent the nanoscale object, constructing a current nanolayer on a first surface and depositing a sacrificial layer to cover the first surface but not the nanolayer. The nanolayer represents a slice of the nanoscale object. The nanolayer and the sacrificial layer provide a second surface on which a next nanolayer is constructed. The construction and deposition steps are repeated if the next nanolayer is not the last nanolayer. As with other methods of fabrication, the method also includes removing sacrificial layers to produce the nanoscale objects.

Yet another method is disclosed in U.S. Pat. No. 6,287,765, issued to Cubicciotti, in which methods are disclosed for detecting and identifying single molecules. In this method, multimolecular devices and drug delivery systems are prepared from synthetic heteropolymers, heteropolymeric discrete structures, multivalent heteropolymeric hybrid structures, aptameric multimolecular devices, multivalent imprints, tethered specific recognition devices, paired specific recognition devices, nonaptameric multimolecular devices and immobilized multimolecular structures.

Advances in TEM have allowed for real-time observation of high-temperature nanofiber formation (Helveg, et al., Atomic-Scale Imaging of Carbon Nano-fibre Growth, Nature, 426-429, 29 Jan. 2004). Helveg, et al., observed carbon-fiber formation at 500° C. as the fiber formed from hydrocarbon vapor behind a metal-catalyst. The state (structure or shape) of the catalyst particle during the growth process, however, remains unknown.

SUMMARY OF THE INVENTION

What is needed are methods, devices and systems for the molecular manipulation, formation, fabrication, control and visualization of micro and nanomolecular structures in real-time. Also needed are methods and systems for the automation and high-throughput manipulation of micro and nanomolecular structures. The present invention takes advantage of transmission electron microscopy (TEM) beam control for the manipulation and synthesis of nano materials from a wide variety of sources. In one example, the beam is a differential TEM beam. The electron beam is used for and allows nano-fabrication of significantly small structures from polymeric material. The capability to manipulate, synthesize, and analyze a material simultaneously, changes the role of TEM in research, development and production of a variety of scientific and commercial products.

Using the present invention, biological, organic and inorganic polymeric materials may be manipulated at the nano and microscale levels using solely the electron beam of the TEM by differentially controlling the electron dosage at the material or sample. While using existing TEMs, the methods of the present invention take advantage of available instruments to not only analyze material, but to manipulate it, and fabricate new products in real-time.

The present invention will find particular usefulness and provides a solution to the constant demand for nano-structures necessary for research and commercial uses. The present invention also allows the capability to synthesize a product while simultaneously observing its fabrication at the nanomolecular level with or without the need for micro and nanomanipulators. Other possible instruments to conduct this type of manipulation do not allow for real-time observation of the manipulation, in particular at low electron levels, due to the need to have a detector that is capable of detecting in real-time, e.g., a YAG crystal laser optically coupled with a silicon intensified target diode video camera.

Yet another advantage of the present invention is that true, real-time monitoring and differential control of studies is achieved that may be used in conjunction with device production at significantly small, nano-meter, scales of a wide range of products. The nano-fabrication of products from a variety of material, biological, and inorganic chemical in nature while simultaneously observing and controlling fabrication is a technological advance over existing protocols and equipment.

More particularly, the present invention includes system and methods for nanofabrication and nanomanipulation of materials by identifying one or more target molecules for manipulation with an electron beam and moving the one or more target molecules with the electron beam. For example, the electron beam may be used to weld or join two or more molecules. The electron beam may generated using, e.g., a transmission electron microscope, which has the advantage of including the ability to view the area where work is conducted when manipulating the electron beam manually. Another important factor is the diameter of the electron beam. For example, some transmission electron microscopes (TEM) have two condenser lenses in series (i.e., C-1 has 5-6 positions; (C-2 is the variable for any single position of C-1). When set to a nanoprobe position, the beam diameter can be a small as 4 nm and as high as 500 nm.

As such, the present invention permits the user to view the one or more target molecules in real-time when manipulating the molecules and the electron beam. Another advantage of the present invention is that the user may, concurrently, identify the one or more target molecules by their x-ray spectra. Depending on the application, the target(s), etc., the electron beam may be a low-dose electron beam. A non-limiting example of a low-dose electron beam is one that operates at 230 electrons/angstrom2/sec.

The system and method of the present invention has the further advantage of being able to operation in a, generally, non-destructive manner or mode. However, the electron beam may also be used for etching one or more target molecules with the electron beam. Any of a limitless variety of target molecules, from individual atoms to complex macromolecules, may be manipulated using the present invention. The electron beam may be used to change the shape, location, bonding, etc., of a polymer. For example, the electron beam may be used to melt or weld a first polymer with a second polymer (which may be the same material or different materials). In another non-limiting example, the one or more target molecules may be semiconductor materials, materials made for processing semiconductors, materials disposed on or about semiconductors, insulators, photoresist, metals, oxides, nitrates, nitrides, organic materials, electrically conductive materials, electrically insulating material, heat transfer materials and the like, as will be known to the artisan skilled in the semiconductor arts.

Yet another system and method of the present invention are devices and processes for molecular manipulation in which one or more target molecules for manipulation are identified with a low-dose, non-destructive electron beam; and the one or more target molecules are manipulated with the electron beam. The electron beam may be generated using a transmission electron microscope operating in bright field (BF) mode, which in addition to manipulation, permits viewing the one or more target molecules in real-time. Alternatively, the microscope may be set for to a darkfield mode. In operation, it is useful and common to switch from BF mode to diffraction mode to analyze the effects of the beam upon organized molecular structure. The one or more target molecules may be polymers, glass, silicon, semiconductor materials, dopants, organic materials, electrically conductive materials and/or electrically insulating materials and the like. While the present invention may be operated manually, industrial and/or high throughput applications permit the molecular manipulation disclosed herein under computer control, that is, the molecular manipulation is automated.

The system of molecular manipulation of the present invention includes a low-dose, non-destructive electron beam that targets one or more target molecules for manipulation and a computer that controls the electron beam to manipulate the one or more target molecules. As will be known to the skilled artisan, it will particularly useful to manipulate the beam, target, etc., with a clean, high vacuum, e.g., a high vacuum above $10^{-7-8}$ Torr.

For examples, the system of molecular analysis may use a low-dose, non-destructive electron beam that targets one or more target molecules for manipulation under computer control to direct the electron beam to manipulate the one or more target molecules, acquires an image of the one or more target molecules and compares the image to in silico calculations of the conformation of the one or more target molecules. Based on the output from the image, the computer directs the electron beam to the one or more targets, selects a power level, and acts on the target molecule(s). The one or more targets may be positioned between a holey copper grid supporting material and the electron beam interacts primarily with the targets and not the supporting materials. Using the system and method of the present invention there will be advantages for the target molecules are charged, which may even be charged in situ. In some circumstances the interaction between the electron beam and the target(s) may induce molecular flow of the target. Depending on the energy applied by the electron beam it may trigger a conformational change in the target, e.g., a repetitive motion, circular, perpendicular or parallel motion and may even be used to case a conformational change in the target that is three-dimensional. When operating in a three-dimensional target may be positioned on a stage that has motion in the x, y and z planes thereby allowing the target to interact with the electron beam in three-dimensions. Alternatively, two or more beams may be used to apply the conformational change, move, weld, etch, etc. with or without interference effects.

Yet another embodiment of the present invention includes a metal filament that has a tip, wherein a pattern on the tip filters an electron stream emanating from the filament. The filter or pattern may be formed on the filament tip by growing, forming or depositing, etching, ablating, implanting, cutting or combinations thereof on the tip. The pattern may even be formed on the tip by using the filament for over 100 hours of operation. The filament may be partially or substantially pure tungsten, platinum, silver, copper, gold, aluminum, titanium, alloys, mixtures and combinations thereof. In one embodiment the filament tip is substantially planar.

The present invention has been used to manipulate, e.g., nematic ordered cellulose (NOC) and polyethylene (PE) in real-time using a TEM. Using the present invention, the image electron beam interactions may be visualized in real-time at a very high resolution (at around 0.3 nm or 3 angstroms) using, e.g., using 30 fps video camera. An yytrium/aluminum/garnet single crystal electron detector (YAG) allows the electron image to be captured in low dose and then transferred by fiber optic coupling to the surface of a silicon intensified target videocon (Gatan Model 620 series or similar). The images are viewed in real time through a video monitor and can be sampled by digitizing or recorded in real time using video. The electron beam can interact with the structural materials allowing for direct manipulation of micro and nanoscale materials, e.g., single polymer chains or a multimeric polymer chains and aggregates, into ordered structures (nanostructures).

In another embodiment, the electron beam of the TEM is under computer control to automatically (and robotically) produce the micro and nano-structures. The present invention may also be used in conjunction with, e.g., laser irradiation followed by the observation of the target structures at high resolution in real time. By using a combination laser with electron beams, the movement and analysis of the target structure is not limited to the exclusive probe of the electron beam. Laser or other devices which heat, inject small quantities of gases, etc. can be used in real time during the fabrication process that occurs with the electron beam of a transmission electron microscope while imaging the process at the same time.

Furthermore, using the present invention the user may conduct elemental analysis in real-time while manipulating and moving objects. Using the present invention, a user or a computer may conduct concurrent analysis and fabrication of a particular atom. The particular atom can be identified due to its particular x-ray wavelength emission prior to or concurrent with its selection for movement.

Another embodiment of the present invention is a filament, e.g., a metal filament or other electron source (e.g., metal alloys) in which a pattern or filter is formed on the tip of the filament and the pattern filters the electron stream emanating from the filament. The pattern may be, e.g., grown, deposited, etched, ablated, implanted, cut or combinations thereof on the tip. One way of making the pattern is to use the tip under normal operating conditions for over 100, 200, 500, 750 or even 1,000 hours of operation. Examples of filament include: tungsten, platinum, silver, copper, gold, aluminum, titanium, alloys, mixtures and combinations thereof. Generally, the shape of the tip of the filament after formation or its use for the hours of operation is substantially planar.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1A:
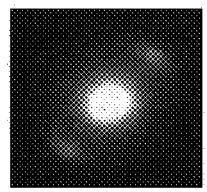
FIGS. 1A to 1D are electron diffraction patterns of the time/course analysis of ultra-drawn polyethylene d-spacings during electron irradiation.

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and are not to delimit the scope of the invention.

As used herein, the term "electron beam" is used to describe any manipulatable electron beam, e.g., an electron beam in an electron microscope whether or not in a vacuum. Beam diameter ranges of between 4 and 500 nm will generally be used. Examples of electron beams that may be used with the present invention include those generated by transmission, scanning or other electron microscopes with or without the ability to visualize the image in real time. Depending on the level of resolution for the molecular manipulation, a very high resolution-condition may be used, e.g., at 0.3 nm or about 3 angstroms. Interference effects may be used to increase or decrease the power and beam with or shape of the electron beam. Additionally the electron beam diameter may be controlled at crossover so that the range of interaction with the target can be optimized. For examples, when using a relatively small beam diameter, fewer molecular entities may be manipulated within the target area, and this differential manipulation may be used to target localized heating by the beam as well as molecular attraction to the beam. Additionally, a laser may be used in conjunction with the electron beam for, visualization, welding, ablation, etc.

The electron beam may be under computer control to automatically (and robotically) produce any micro and nano-structures, move molecules to their target location and the like. By using a combination laser with one or more electron beams, the movement and analysis of the target structure is not limited to the exclusive probe of the electron beam. Laser or other devices that ablate, heat, inject small quantities of gases, etc., can be used in real time during the fabrication process that occurs with the electron beam of a transmission electron microscope while imaging using, e.g., spectroscopy, microscopy, mass spectrometry, gas chromatography, nuclear magnetic resonance, Raman spectroscopy, and the like at the same time. Alternatively, the one or more electron beams may be used in conjunction with x-rays or other emissions prior to or concurrent with its selection for movement.

The capability to observe and manipulate material simultaneously at the nanoscale level is predicted to be invaluable in the design of nano-fabrication approaches. Manipulation and real time observation in conjunction with a nanoscale size are vital in determining not only beginning and end products but also intermediates in the process of polymerization and polymer crystallization, leading to supermolecular architecture via material synthesis.

The present invention uses a transmission electron microscope (TEM) to image, manipulate and alter materials, e.g., polyethylene in real time. Furthermore, the low dose, diffraction capabilities and high resolution of TEM permit the imaging of single polymer chains during specific beam manipulations to control, visualize and fabricate at the nanoscale level. These approaches with TEM have heretofore not been recognized for a variety of reasons, including preconceived ideas of beam damage, thermal oxidation, free radical formation, and a host of other damaging conditions during electron irradiation (5). Theoretically, but in no way a limitation to the present invention, a TEM beam may trap and manipulate significantly smaller particles and allow finer image resolution in nearly 'real time' modes (30 f/sec video) (1, 2). On the other hand, reported disadvantages of electron beams are that they are highly electronegative, and many specimens must be fixed or stained for imaging (5).

Ultra-fine structural analysis of polymers rarely exceeds 20K magnification of crystalline polymers for fear of damage to the specimen (5,6). In addition, it has been well documented that the combination of the electro-negativity and the actual collision of electrons with the specimen matrix can cause specimen damage and false artifacts (5). Electron beam damage cannot be entirely eliminated, but it can be minimized with the use of low electron doses from tungsten filament sources and with high sensitivity electron detection equipment (such as SIT-tube video cameras coupled with YAG crystals). With this in mind, and with more than a decade of experience using low dose imaging of atomic and molecular structure, the present inventors developed a model polymer system for highly detailed molecular imaging in real time. The polymer system used is an ultradrawn polyethylene sample with 92% crystallinity and having an orientation factor (F200) of the c-axis of 0.99 (7).

Uniaxially oriented polyethylene films were obtained from single crystal gel mats crystallized from solution that were stretched to 20,000% elongation (UDPE)(7). The films were cut to fit in the 3 mm grid holder of a Philips 420 TEM. The film was sandwiched between two 3 mm copper TEM grids. No staining or fixative preparations were made. Low electron dose and high-resolution conditions were maintained at 100 kV to minimize electron damage of the specimens. Studies with the beam spot size were conducted, and measured in situ. Measurements of specific beam spot settings were conducted to measure the environment at the specimen plane. In one specific embodiment, the electron beam's size, shape, intensity, and motion all could be computer controlled to achieve various modalities in movement (or conformational change), whereby the user is not only able to acquire images in real-time, but also control the movement of one or more molecules in situ. Beam current and diameter data were collected for beam spot sizes 4 through 6 on the Philips 420 TEM at 33K magnification at crossover for under saturation, approaching saturation and fully saturated points. The beam current was read from a Keithly auto-ranging pico-ammeter. For example, the undersaturation data point for the filament was designated as four clicks counterclockwise from the fully saturated point on the filament current dial, and the approaching saturation data point was two clicks counterclockwise from saturation. As will be apparent to those of skill in the art, the specific equipment and manner of use will vary based on the actually equipment and set-up provided.

All images were captured by a Gatan 620 video camera linked to a Dell Dimension PC running Image Pro Plus digital imaging software. The image is first captured on a YAG crystal, which produces a grain-less photon image from the electron image. Then the photon image is recorded by a silicon intensified target vacuum tube vidicon. The actual scan rate on this instrument is 30 f/sec. The analog signal was digitized with a Matrox frame grabber, and the digital image captured by Image Pro Plus 4.1 software. Measurements were calibrated by imaging the 0.335 nm inter-atomic graphene spacings of graphite. The images were recorded to CD-ROM RW disks and analyzed via several data processing software platforms including Zeiss KS 400, Adobe Photoshop Pro, and Paintshop Pro. In one specific example, the video capture detector is a Gatan 620 series video camera, e.g., Model 622, which are listed as $10^{-13}$-$10^{-9}$ amps/cm$^2$ on the camera. Equivalent video cameras may be used, albeit with less sensitivity than a 620 series, e.g., a Model 676 has a smaller active area and the intensifier is only the size of a nickel. The 676 has a sensitivity of about $10^{-14}$-$10^{-10}$ amps/cm$^2$.

Figure 1B:
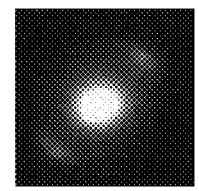
Figure 1C:
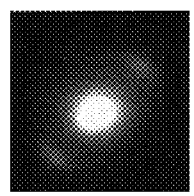
Figure 1D:
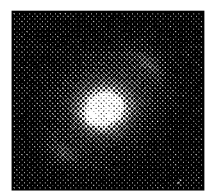
Figure 1E:
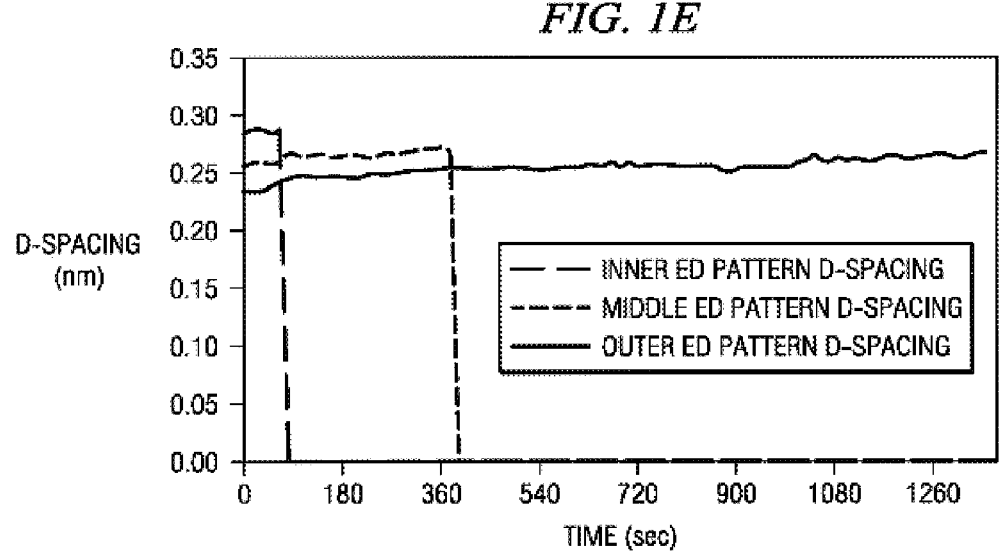
FIG. 1E is a graph that shows the d-spacings vs time showing the points where the d-spacings become unrecognizable (dotted lines)

FIGS. 1A to 1D are electron diffraction patterns in a time/course analysis of ultra-drawn polyethylene d-spacings during electron irradiation. Draw axis of the ultra-drawn polyethylene film (UDPE) is oriented from lower right to upper left. Equatorial reflections are shown. FIG. 1A was taken at the moment of initial electron irradiation (beam spot size 6, magnification=7.5K, accelerating voltage=100 kV, with a beam current=0.0025 nA, representing an approximate flux of 230.7 electrons/Å$^2$/sec). There are 3 distinct ED patterns, corresponding to a D-spacing of 0.2854 nm, 0.2563 nm, and 0.2337 nm. These D-spacings correspond most closely with one half of the dimensions of the 010 axis of a PE unit cell. FIG. 1B was taken 90 seconds of irradiation. Note that the innermost diffraction pattern has dissipated, leaving outermost reflections intact, but with slightly widened d-spacings. Total irradiation at this point is approximately 20,763e–/Å$^2$. FIG. 1C was taken 405 seconds of irradiation. At this point only the original outermost reflection is present. Total irradiation=93,433e–/Å$^2$. FIG. 1D was taken 600 seconds of irradiation. Total irradiation=138,420e–/Å$^2$. This reflection stabilizes during continued electron irradiation beyond 1200 seconds to an approximate d-spacing of 0.2682 nm. Total irradiation=276,840e–/Å$^2$. FIG. 1E is a graph of the d-spacings versus time showing the points where the d-spacings become unrecognizable (dotted lines). Note that the outermost reflection appears most stable during electron irradiation, even up to more than 1200 sec.

When UDPE was exposed to the electron beam, several interesting reactions take place. Under low dose imaging at low magnifications, the relatively thin margins of UDPE allow transmission of the electron beam so that real time electron diffraction measurements are possible. FIGS. 1A-1D show results typical of extended irradiation along with the monitoring of the sample using electron diffraction. The time-course analysis shows preservation of the b dimension of the unit cell (=010 lattice plane spacing) where the outermost reflection remains relatively unchanged over more than 1200 sec of electron beam irradiation, which represents more than 276,840 e/A$^2$. Remarkably, the preservation of a semi-crystalline structure with seemingly high total dose was achieved; however, the sample received only 237e/A$^2$/sec, which may be sufficiently low to stabilize the polymer structure thus preventing further damage. Under similar irradiation conditions, the enzymatic activity was examined, which is preserved by the addition of uranyl acetate (8). These results shed light on the interaction between the electron beam and preservation, namely that under relatively low electron beam dosages (ca 300e/A$^2$) the sample can be sufficiently stabilized to allow continued exposure to the beam. Therefore, manipulation of the electron beam may be used to create novel materials at the nanoscale level.

Figure 2A:
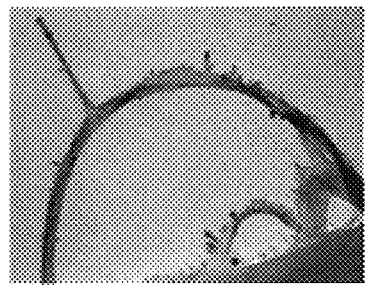
FIGS. 2A to 2D are TEM photographs of UDPE at different resolutions and using filtering.
Figure 2B:

FIGS. 2A to 2D are TEM photographs of UDPE at different resolutions and using filtering. FIG. 2A shows the arches of fragmented or displayed aggregates of UDPE under relatively low electron beam dosage. Presumably weak zones in the stretched film splay and separate from the main body, then undergo a unique charge repulsion interaction to form "arches". Further separations yield smaller aggregates whose orientation is perpendicular to the splayed arches. Presumably, the surfaces of the aggregates have become ionized during the irradiation, and the charge repulsion is reflected as a vector between the charges of the surrounding materials (the smaller aggregates also have distinct equatorial and meridional e-diffraction patterns suggesting that the separated polymers maintain d-spacings during the irradiation). FIG. 2B is a high magnification view of a mobile viscous finger extrusion which appears during higher electron beam doses. This 'finger' was grown from the main body of the UDPE. No electron diffraction patterns could be recorded from this material even though ordered linear regions could be observed. Electron dosages rates of approximately 6192.4 e– per $Å^2$/sec were required to generate the mobile fingers.

Figure 2C:
Figure 2D:
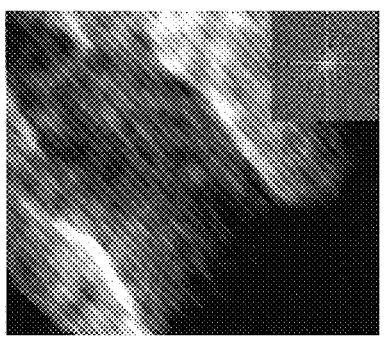

During irradiation and motion, lateral branches always with acute angles (41.9°+/–17.27°), were produced. In turn, these sub-divided into smaller branches with the same conserved angles. Real time video images of finger development and movement have been recorded and suggest single polymer chain growth occurs via a 'ratcheting' model. FIG. 2C shows the same image with inverse FFT of selected area of interest with spike boosted regions (inset) via Image Pro Plus 4.1 software. Image shows there is a general orientation of the polymer chains during finger formation. The average d-spacing is approximately 1.49 nm which is larger than the crystalline d-spacings (FIG. 2D). Alternative inverse FFT from Zeiss KS400 image processing software of the entire image showing nearly identical order (to image 2C above) when selected wavelengths (inset) are chosen for inversion. FIGS. 2B to 2D demonstrate that the inverted wavelengths are not artifacts of the software, the FFT, or the inversion.

During low dose exposures, how the sample behaved in the beam may be indicative to better understand the effects in terms of charge-repulsion theory. In FIGS. 2A to 2D, the thin margin of UDPE allowed electrons to be transmitted and thus diffracted, revealing much about the nature of the irradiation process. In addition to the electron diffraction patterns described above, the samples tended to show a characteristic charge-repulsion through the splaying of aggregates of PE. Next, it was determined whether during irradiation free radicals were produced on the polymer chain aggregate surface. It was found that the core regions maintain their relatively undisturbed crystalline structure (as evidenced by electron diffraction, data not shown). Often, the aggregates form at right angles to the surface of the stretched PE sheet, suggesting that the charge repulsion effect is best neutralized perpendicular to the sheet axis. This is further supported by perpendicular sub-aggregates which split from curved surfaces of earlier splayed aggregates (FIG. 2A).

When charge repulsion occurs in conjunction with a semi-fluid state, a more complicated yet nevertheless interesting picture emerges. Higher electron beam doses appear to 'melt' the polymer chain aggregates while maintaining molecular chain ordering, and they move in real time, and in predicted directions from the UDPE surfaces. FIG. 2B shows a viscous finger that is formed within a few seconds exposure. This 'finger' always propagates toward the center of the electron beam producing branches which are consistently oriented less than 90 degrees.

High resolution TEM analysis of the structures at the tip of a growing viscous finger revealed what appear to be single polyethylene polymer chains migrating from the surface, followed by movements of multiple polymer chain aggregates. What enabled this 'fluidity' may be that the sample is sufficiently heated and charged through free radical formation, a charge-charge repulsion 'lubricates' the polymer chains so that they can actually migrate toward the center region of the electron beam. A single pixel gray value trace of electron intensity across the beam (data not shown) indicated a Gaussian distribution of electrons. The total net charge within the beam was found to be greatest at its center. Thus, the beam intensity can 'direct' by attraction of oppositely charged free radicals on the polymer surfaces. The result was the directed movement of the polyethylene toward the center of the beam.

During viscous finger formation, multiple polymer chains appear to migrate parallel to each other en masse, yet maintain a specified directional order as shown by FFT analyses in FIGS. 2C and 2D. Even though viscous fingers do not reveal any electron diffraction patterns, they did have order. While not wishing to be bound by any theory, the reasoning in support of this conclusion is now set forth. If the polymer chains maintain nematic order (e.g., order but very low crystallinity) during electron irradiation, the charge repulsion hypothesis would still hold in this case, but at a much lower interaction, such that individual polymer chains are sufficiently charged via free radical formation so that they maintain association (e.g., order) but lack 'locked in' crystalline order, which allows for directed chain motion derived by the net charge with electron beam. Thus, the FFT analysis of parallel molecular order within the viscous finger was valid and verified the behavior of viscous finger motion in the electron beam.

Viscous finger branching can also be explained in terms of the charge-repulsion hypothesis and interaction with the electron beam. The tip of the finger always orients toward the center of the electron beam, and the normal progression of events is a 'burst' of one or more single polymer chains from the surface. If these single polymer chains have sufficient charge, they repel each other at their tips, but they are still anchored within the mass of oriented chains. Thus, the mutual repulsion creates the acute angle which becomes stabilized by the multiple migrations of single polymer chains to form the ordered viscous finger mass. The charging and heating of the sample drives the nanoscale propagations.

Melting via heating, and charge distribution through free radical formation constitute and control the nanoscale movements of PE in the electron beam. Remarkably, these interactions allow actual imaging of single polymer chains and their aggregates in real time using low dose TEM. The consequences of these interactions lead to the possibility of controlled nano orientation and nano fabrication of novel structures. This point was illustrated with UDPE, however a similar behavior was observed with ultradrawn isotactic polypropylene and nematic ordered cellulose in the electron beam (data not shown). Extending these manipulations to a broad range of materials could lead to nanofabrications using a range of polymers and their derivatives.

Figure 3A:
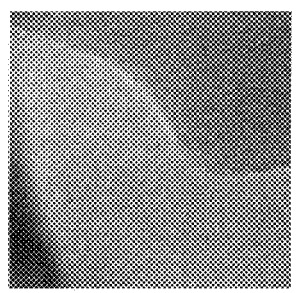
FIGS. 3A to 3D are photographs of the nanoscale manipulation of PE.
Figure 3B:
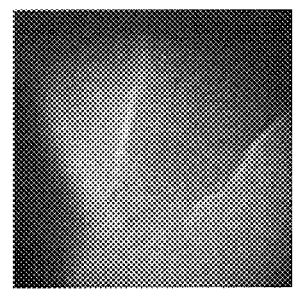
Figure 3C:
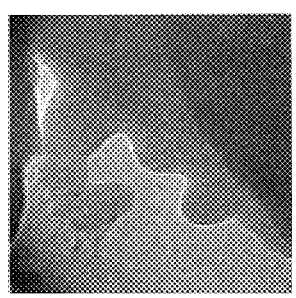
Figure 3D:
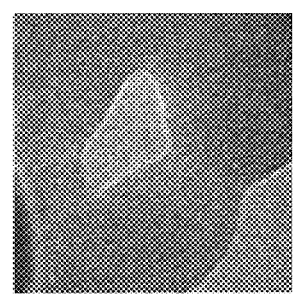

FIGS. 3A- to 3D show a sequence of electron beam manipulations during the growth of viscous fingers. FIG. 3A was taken at the beginning of manipulative study, the center of the electron beam is out of the image field at the lower left hand corner. The initial formation of a dome occurs with its top center pointed in line with the center of electron beam. The dome later became a viscous finger. Viscous fingers always grew toward the center of the beam. FIG. 3B shows a 'dome' of PE that arose from the upper right hand region of the photo and became extended showing dendritic chain branching and propagation toward the center of the electron beam. FIG. 3C provides a better understanding of the principle of oriented attraction to the center of the electron beam, when it was manipulated to cause formation of a curved 'hook' from the extended dome in FIG. 3B as well as to initiate a new outgrowth dome from the original matrix toward the center of the beam. FIG. 3D shows that continued irradiation produced a closed loop, completing the real time fabrication and imaging of a novel nano-ring structure.

Figure 4:
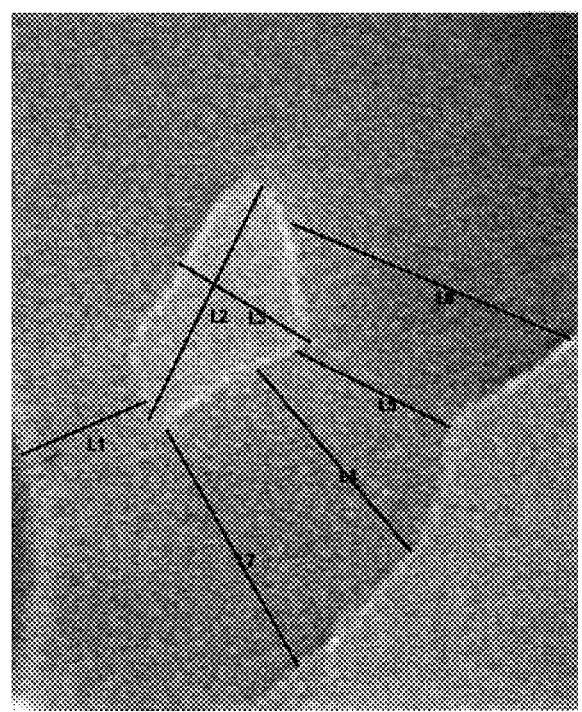
FIG. 4 is a photograph of a nanoscale closed loop nanoring manufactured using the methods and system of the present invention.

FIG. 4 shows the measured dimensions of the closed loop nano-ring: L1=8.03 nm to overlapping fold of significantly thin polymer matrix. L2=15.30 nm across the long dimension of the center hole, L3=8.63 nm across the short dimension of the center of the ring. L4=13.53 nm, L5=10.10 nm at the fusion point, L6=was out of the image frame and discarded, L7=16.04 nm, and L8=16.49 nm across the bases of the final extension closure.

Using the present invention the user is also able to view, in real-time when molecules undergo conformational change. While one particular application is to change their shape while object is in motion, the present invention is also able to image and analyze the motion of one or molecules in real-time. As such, the present invention allows the user to actually image molecular movement and to map it. The present invention may be used in conjunction with molecular dynamics and conformational changes calculated in silico with actual measurements in situ.

Figure 5:
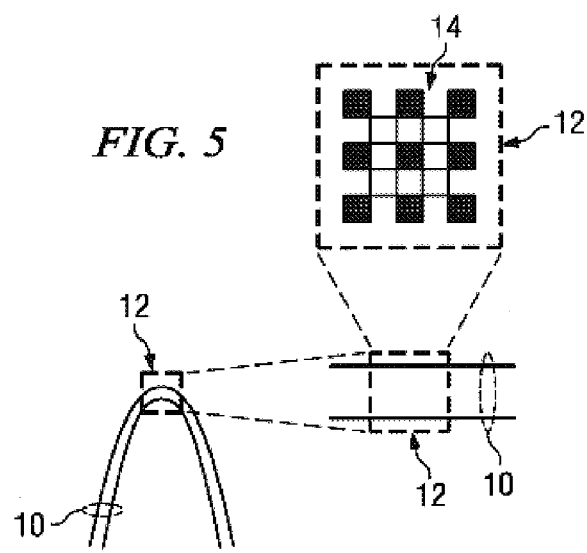
FIG. 5 is a diagram that shows a filtered filament of the present invention.

In operation, the present invention may be used as follows. FIG. 5 shows a tungsten hairpin filament 10 (FEI, USA). When used at a low beam current (less than 5 microamps), with the saturation and beam current controls minimized, the filament 10 has an extended life, that is, it usually does not blow or suddenly burn out. It has been found that even at 100 kv up to 120 kv, the filament will last one year or more with intensive use. After use, it was found that the geometry of the electron beam gradually begin to change, as shown in a magnified view of the tip 12, i.e., the electron cloud produced from the tip 12 was not longer circular. When the tip 12 of the filament was observed under the dissecting scope, it was found to be coated by with a black, glassy-like material 14. The coating 14 of the tip 12 may have prevented electron emission from the coated regions of the tip 12. As such, the "filter" effect produced at the tungsten filament 10 tip 12 allows selective electron emission.

Therefore, the present invention also includes a micro embossed grid pattern on the tip 12 of the tungsten filament 10. By controlling the nature, shape, pattern, thickness, depth, etc. geometry and nature of the pattern on the filament tip, it is possible to effect different electron beam patterns, shaped, beam intensity and the like. The pattern may be deposited, formed, etched, grown, cut, coated, etc. using techniques known in the art. One simply way for forming the "filter" pattern is to use the filament for extended periods of time under different conditions (e.g., vacuum strength, exposure to one or more gases, photoresits, etc), such as using the filament for 100, 200, 500, 750 or even 1000 hours of operation. It was found that after, e.g., 1000 hours using a tungsten filament, a pattern was formed on the tip 12, which was substantially planar and that created the filtered electron beam.

All publications mentioned in the above specification are hereby incorporated by reference, in whole or in part, depending on the relevance of the portion. Modifications and variations of the described compositions and methods of the invention will be apparent to those skilled in the art without departing from the scope and spirit of the invention. Although the invention has been described in connection with specific embodiments, it should be understood that the invention as claimed should not be unduly limited to such specific embodiments. The present invention is not limited by any theory of operation. Indeed, various modifications of the described compositions and modes of carrying out the invention that are obvious to those skilled in molecular biology, integrated circuits, display devices, nanotechnology, micro and nanomanipulators, micro and nanoactuators, or related arts are intended to be within the scope of the following claims.

REFERENCES

1) Brown, B. A. & Brown, P. R. Optical Tweezers: Theory And Current Applications. *Amer. Lab.* 2001; Nov, 13-20.
2) Ashkin, A. Optical Trapping And Manipulation Of Neutral Particles Using Lasers. *PNAS USA.* 1997; 94, 4853-60.
3) Pearce, R. & Vansco, G. J. Real-Time Imaging Of Melting And Crystallization Of Poly(Ethylene Oxide) By Atomic Force Microscopy. *Polymer.* 1998; 39,5,1237-42
4) Hobbs, J. K; Humphris, A. D. L. & Miles, M. J. In-Situ Atomic Force Microscopy Of Polyethylene Crystallization; Crystallization From An Oriented Backbone. *Macromolecules.* 2001; 34 5508-19.
5) Williams, D. B. & Carter, C. B. Transmission Electron Microscopy: A Textbook For Materials Science. Plenum Press, New York 1996, Vol. 1-4.
6) Peacock, A. J. Handbook of Polyethylene: Structures, Properties And Applications. Marcel Dekker, Inc. New York. 2000
7) Sawatari, C. & Matsuo, M. Elastic Modulus of polyethylene in the Crystal Chain Direction as Measured by X-ray Diffraction. *Macromolecules,* 1986 19, 2036-40.
8) Unpublished work, T. Spires and R. M. Brown. An enzyme assay was developed for samples loaded onto a 3 mm TEM grid. When uranyl acetate is used as a negative stain, it also preserves enzymatic activity after electron beam irradiation.
9) Kondo, T., Togawa, E. and Brown Jr., R. M., *Biomacromolecules,* 2, 1324-1330 (2001).
10) Helveg, et al., Atomic-Scale Imaging of Carbon Nanofibre Growth, *Nature,* 426-429, 29 Jan. 2004

What is claimed is:

1. A method of nanofabrication comprising the steps of:
identifying one or more target molecules for manipulation with an electron beam; and
targeting the one or more target molecules with the electron beam, wherein the electron beam causes an event at the target molecule.

2. The method of claim 1, wherein the event is defined further as comprising the moving, welding, ablating, etching or joining two or more molecules with the electron beam.

3. The method of claim 1, wherein the electron beam is generated using a transmission electron microscope.

4. The method of claim 1, wherein the manipulation occurs while viewing the one or more target molecules in real-time.

5. The method of claim 1, further comprising the step of determining the identity of the one or more target molecules by their x-ray spectra.

6. The method of claim 1, wherein the electron beam comprises a low-dose electron beam.

7. The method of claim 1, wherein the electron beam a low-dose electron beam at 230 electrons/angstrom$^2$/sec.

8. The method of claim 1, wherein the electron beam is generated from a filament with a controlled gird pattern to filter the diameter, range, or geometry of the electron beam.

9. The method of claim 1, further comprising the step of etching one or more target molecules with the electron beam.

10. The method of claim 1, wherein the one or more target molecules are further defined as a polymer and the electron beam is used to change the shape of the polymer by heating, melting, ablating or moving.

11. The method of claim 1, wherein the one or more target molecules are further defined as a first polymer and the electron beam is used to melt or weld the first polymer with a second molecule.

12. The method of claim 1, wherein the one or more target molecules comprise a semiconductor material.

13. The method of claim 1, wherein the one or more target molecules comprise an organic material.

14. The method of claim 1, wherein the one or more target molecules comprise an electrically conductive material.

15. The method of claim 1, wherein the one or more target molecules comprise an electrically insulating material.

16. A method of molecular manipulation comprising the steps of:
identifying one or more target molecules for manipulation with a low-dose, non-destructive electron beam; and
manipulating the one or more target molecules with the electron beam.

17. The method of claim 16, wherein the electron beam is generated using a transmission electron microscope operating in brightfield, darkfield or phase contrast mode.

18. The method of claim 16, further comprising the step of viewing the one or more target molecules in real-time.

19. The method of claim 16, wherein the one or more target molecules are selected from a semiconductor material, an organic material, an electrically conductive material or an electrically insulating material.

20. The method of claim 16, wherein the one or more target molecules are further defined as a polymer and the electron beam is used to change the shape of the polymer and move the polymer in real time.

21. The method of claim 16, wherein the molecular manipulation is under computer control.

22. The method of claim 16, wherein the molecular manipulation is automated.

23. The method of claim 16, wherein the molecular manipulation is by a high-throughput, automated, computer controlled system.

24. A system of molecular manipulation comprising:
a low-dose, non-destructive electron beam that targets one or more target molecules for manipulation; and
a computer that controls the electron beam to manipulate the one or more target molecules.

25. A system of molecular analysis comprising:
a low-dose, non-destructive electron beam that targets one or more target molecules for manipulation;
a computer that controls the electron beam to manipulate the one or more target molecules, acquires an image of the one or more target molecules and compares the image to in silico calculations of the conformation of the one or more target molecules.

26. The system of claim 25, wherein the one or more targets are positioned between a holey copper grid supporting material and wherein the electron beam interacts primarily with the targets and not the supporting materials.

27. The system of claim 25, wherein the target molecules are charged.

28. The system of claim 25, wherein the target molecules are charged in situ.

29. The system of claim 25, wherein interaction between the electron beam and the targets induces a molecular flow.

30. The system of claim 25, wherein the electron beam triggers a conformational change in the target.

31. The system of claim 25, wherein the electron beam triggers a conformational change in the target in a repetitive motion.

32. The system of claim 25, wherein the electron beam triggers a conformational change in the target that is circular, perpendicular or parallel.

33. The system of claim 25, wherein the electron beam triggers a conformational change in the target that is three-dimensional.

34. The system of claim 25, wherein the target is positioned on a stage that has motion in the x, y and z planes thereby allowing the target to interact with the electron beam in three-dimensions.

35. A filament comprising:
a metal filament comprising a tip, wherein a pattern on the tip filters an electron stream emanating from the filament.

36. The filament of claim 35, wherein the pattern is grown, deposited, etched, ablated, implanted, cut or combinations thereof on the tip.

37. The filament of claim 35, wherein the pattern is formed on the tip by using the filament for over 100 hours of operation.

38. The filament of claim 35, wherein the filament comprises tungsten, platinum, silver, copper, gold, aluminum, titanium, alloys, mixtures and combinations thereof.

39. The filament of claim 35, wherein the tip is substantially planar.

40. A method of molecular manipulation comprising the steps of:
identifying one or more target molecules for manipulation with a low-dose, non-destructive electron beam that is continuous, discontinuous irradiation, pulsed irradiation, pulsed beam diameter change or a continuous beam diameter; and
manipulating the one or more target molecules with the electron beam.

* * * * *